(12) United States Patent
Hsu et al.

(10) Patent No.: US 10,915,142 B2
(45) Date of Patent: Feb. 9, 2021

(54) DOCK OF MOBILE COMMUNICATION DEVICE AND OPERATION METHOD THEREFOR

(71) Applicant: VIA LABS, INC., New Taipei (TW)

(72) Inventors: Chin-Sung Hsu, New Taipei (TW);
Chih-Long Ho, New Taipei (TW);
Nai-Chuan Hung, New Taipei (TW);
Chih-Hsien Lin, New Taipei (TW);
Hung-Chih Chiu, New Taipei (TW)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 16/457,936

(22) Filed: Jun. 29, 2019

(65) Prior Publication Data
US 2020/0103939 A1 Apr. 2, 2020

(30) Foreign Application Priority Data
Sep. 28, 2018 (TW) .............................. 107134327 A

(51) Int. Cl.
| | |
|---|---|
| *H04R 1/40* | (2006.01) |
| *G06F 1/16* | (2006.01) |
| *H04R 3/00* | (2006.01) |
| *H04R 5/027* | (2006.01) |
| *H04R 5/04* | (2006.01) |

(52) U.S. Cl.
CPC ........... *G06F 1/1632* (2013.01); *H04R 1/406* (2013.01); *H04R 3/005* (2013.01); *H04R 5/027* (2013.01); *H04R 5/04* (2013.01)

(58) Field of Classification Search
None
See application file for complete search history.

(56) References Cited

U.S. PATENT DOCUMENTS

| | | | | |
|---|---|---|---|---|
| 10,686,984 B1* | 6/2020 | Schmidt | ............. | H04N 5/23238 |
| 2012/0083314 A1* | 4/2012 | Ng | ............................ | H04M 1/11 |
| | | | | 455/557 |

(Continued)

FOREIGN PATENT DOCUMENTS

| | | |
|---|---|---|
| CN | 101282452 | 10/2008 |
| CN | 102256098 | 11/2011 |

(Continued)

OTHER PUBLICATIONS

English machine translation of WO2018154983 (Year: 2018).*

*Primary Examiner* — James K Mooney
(74) *Attorney, Agent, or Firm* — JCIPRNET

(57) ABSTRACT

A dock and an operation method therefor are provided. The dock is suitable for propping up a mobile communication device. The dock includes an audio-receiving circuit, a rotating module, a communication circuit, and a controller circuit. The controller circuit is coupled to the audio-receiving circuit, the rotating module, and the communication circuit. The controller circuit transmits at least one of a plurality of audio signals generated by the audio-receiving circuit to the mobile communication device through the communication circuit, and determines an audio direction of an audio source according to the plurality of audio signals. The controller circuit controls the rotating module to rotate according to the audio direction, so as to bring the mobile communication device face toward the audio source.

16 Claims, 7 Drawing Sheets

(56) References Cited

U.S. PATENT DOCUMENTS

| | | | |
|---|---|---|---|
| 2013/0044893 A1 | 2/2013 | Mauchly et al. | |
| 2013/0176414 A1* | 7/2013 | Hwang | G06K 9/00261 |
| | | | 348/77 |
| 2016/0379107 A1* | 12/2016 | Li | G06N 3/008 |
| | | | 706/11 |
| 2017/0206900 A1* | 7/2017 | Lee | G10L 15/22 |
| 2018/0174584 A1* | 6/2018 | Chih | H04R 3/005 |
| 2020/0322540 A1* | 10/2020 | Tsujimoto | H04R 3/005 |

FOREIGN PATENT DOCUMENTS

| | | |
|---|---|---|
| CN | 102673483 | 9/2012 |
| CN | 102968991 | 3/2013 |
| CN | 104580992 | 4/2015 |
| CN | 106887236 | 6/2017 |
| CN | 108231073 | 6/2018 |
| TW | 201330609 | 7/2013 |
| WO | WO2018154983 A1 * | 8/2018 |

* cited by examiner

DOCK OF MOBILE COMMUNICATION DEVICE AND OPERATION METHOD THEREFOR

CROSS-REFERENCE TO RELATED APPLICATION

This application claims the priority benefit of Taiwan application serial no. 107134327, filed on Sep. 28, 2018. The entirety of the above-mentioned patent application is hereby incorporated by reference herein and made a part of this specification.

BACKGROUND

Technical Field

The disclosure relates to an electronic device, and in particular to a dock of mobile communication device and operation method thereof.

Description of Related Art

When a plurality of people are using a same mobile communication device (such as a cellphone or a tablet) to perform a remote call (or a remote meeting), a user needs to move the mobile communication device before a speaker by hand to maintain a good audio effect when changing speakers. In addition, the user also needs to face a camera of the mobile communication device to a speaker (to allow the speaker to show up in the camera) by hand, so that remote ends (meeting participants at remote ends) would know who is speaking. When the speaker is not in a photographing scope of the camera, the remote ends would not be able to know who is speaking.

SUMMARY

The disclosure provides a dock used to prop up a mobile communication device. According to an audio direction of an audio source, the dock may dynamically bring the mobile communication device to face toward the audio source.

An embodiment of the disclosure provides a dock, which is suitable for propping up a mobile communication device. The dock includes an audio-receiving circuit, a rotating module, a communication circuit, and a controller circuit. The audio receiving circuit is used to receive audios to different audio-receiving directions to obtain a plurality of audio signals. The rotating module is used to rotate the mobile communication device. The communication circuit is used to connect the mobile communication device. The controller circuit is coupled to the audio-receiving circuit, the rotating module and the communication circuit. The controller circuit transmits at least one of the plurality of audio signals to the mobile communication device through the communication circuit. The controller circuit determines an audio direction of an audio source according to the plurality of audio signals, and to control the rotating module to rotate according to the audio direction of the audio source, so as to bring the mobile communication device to face toward the audio source.

An embodiment of the disclosure provides an operation method of a dock, wherein the dock is suitable for propping up a mobile communication device. The operation method includes following steps. A plurality of audio signals is obtained through an audio-receiving performed by an audio-receiving circuit of the dock to different audio-receiving directions. One of the plurality of audio signals is transmitted to the mobile communication device by a communication circuit of the dock. An audio direction of an audio source is confirmed by a controller circuit of the dock according to the plurality of audio signals. In addition, a rotating module of the dock is controlled by the controller circuit to rotate according to the audio direction of the audio source, so as to make the mobile communication device face toward the audio source.

Based on the above, the dock and the operation method of embodiments of the disclosure receive audios through the audio-receiving circuit of the dock, and the controller circuit of the dock determines an audio direction of an audio source according to a plurality of audio signals of the audio-receiving circuit. According to the audio direction, the rotating module of the dock may automatically bring the mobile communication device to face toward the audio source. In some applicable scenarios, the dock of the embodiments of the disclosure be applied to a remote call (or a remote meeting) with a mobile communication device. Meeting participants would not have to change a position and/or a direction of the mobile communication device by hand. The dock may automatically bring the mobile communication device to track a speaker.

In order to make the features and advantages of the disclosure mentioned above more understandable, embodiments will be described in detail below with reference to the accompanying drawings.

DESCRIPTION OF THE EMBODIMENTS

Figure 1:
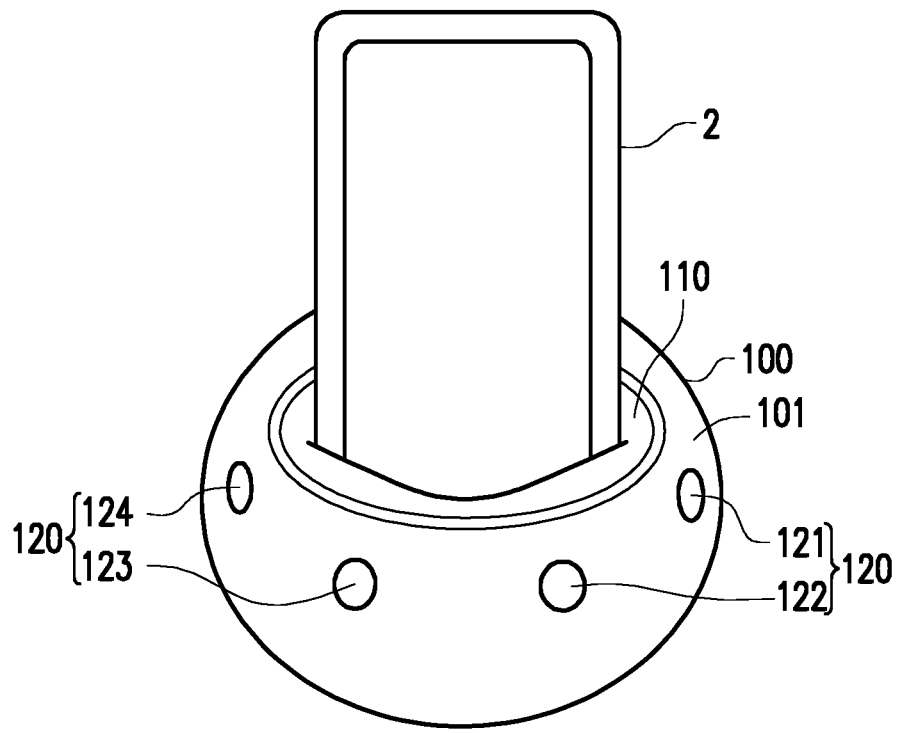
FIG. 1 is a schematic view of an exterior of a dock according to an embodiment of the disclosure.

FIG. 1 is a schematic view of an exterior of a dock according to an embodiment of the disclosure. Please refer to FIG. 1. A dock 100 shown in FIG. 1 is used to prop up a mobile communication device 2, such as a smart phone, a Personal Digital Assistant (PDA), a tablet or other electronic devices that are portable and have communication functions. The dock 100 has a body 101 and a rotating module 110. In an embodiment shown in FIG. 1, the rotating module 110 has a socket to support the mobile communication device 2, and the rotating module 110 is accommodated in the body 101 and rotates relative to the body 101. In another embodiment, a socket to accommodate the mobile communication device 2 is disposed to the body 101, and the rotating module 110 is disposed between the body 101 and the placing surface (such as a desk surface) to rotate the body 101. The rotating module 110 may be controlled by an electrical signal to rotate, such as clockwise rotating or counter clockwise rotating. The disclosure does not limit mechanism and electrical driving components of the rotating module 110. According to design requirements, in some embodiments, an electrical driving component of the rotating module 110 may include a known driving motor (including a driving circuit) or other driving circuits/components.

The dock 100 further includes an audio-receiving circuit 120. The present embodiment does not limit implementation details of the audio-receiving circuit 120.

According to design requirements, in some embodiments, the audio-receiving circuit 120 may include a microphone array. In an embodiment of FIG. 1, the audio-receiving circuit 120 may include an audio-receiving component 121, an audio-receiving component 122, an audio-receiving component 123 and an audio-receiving component 124. According to design requirements, the audio receiving components 121-124 may include a known microphone or other audio sensing circuits/components. A number of audio-receiving circuits of the audio-receiving circuit 120 may be decided according to design requirements.

A plurality of audio-receiving components 121-124 is disposed on an outer surface of the body 101. Positions of the plurality of audio-receiving components 121-124 may be decided according to design requirements. For example, the plurality audio-receiving components 121-124 may exhibit a circular distribution as shown in FIG. 1, making audio-receiving directions of the plurality of audio-receiving components 121-124 different from one another. The plurality of audio-receiving components 121-124 may receive audios (audio sensing) to obtain a plurality of audio signals corresponding to different audio-receiving directions.

Figure 2:
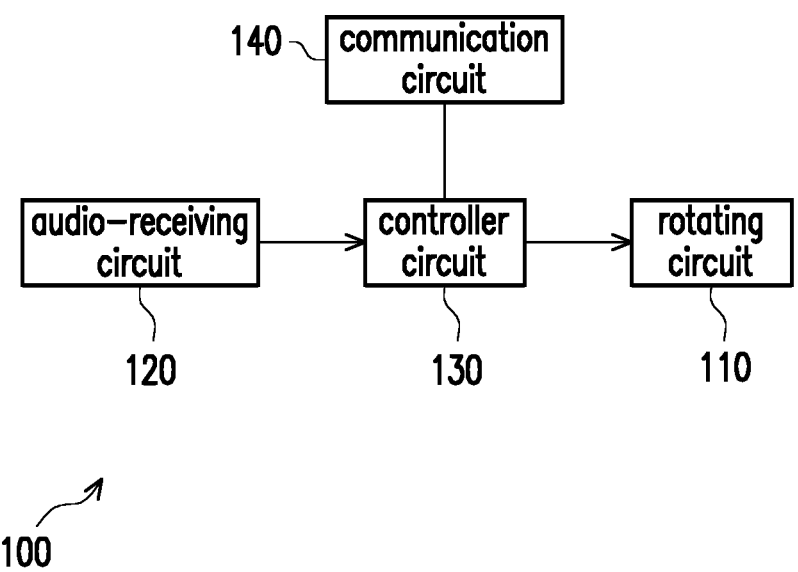
FIG. 2 is a schematic view of a circuit block of the dock according to a first and a second embodiments of the disclosure.

FIG. 2 is a schematic view of a circuit block of the dock 100 according to a first and a second embodiments of the disclosure. Please refer to FIG. 1 and FIG. 2. The dock 100 includes the audio-receiving circuit 120, the rotating module 110, a communication circuit 140 and a controller circuit 130. The audio-receiving circuit 120 may include a plurality of audio-receiving components, such as the audio-receiving components 121-124 shown in FIG. 1. The plurality of audio-receiving components 121-124 faces different audio-receiving directions. The audio-receiving circuit 120 receives audios through the plurality of audio-receiving circuits 121-124 to obtain a plurality of audio signals related to different audio-receiving directions. According to design requirements, a filter, an analog digital converter or/and other audio signal processing circuits may be disposed to the audio-receiving circuit 120 to pre-process an audio signal (such as eliminating a noise). The controller circuit 130 is coupled to the audio-receiving circuit 120, so as to receive an audio signal.

The controller circuit 130 is coupled to the communication circuit 140. The communication circuit 140 is used to connect the mobile communication device 2. The controller circuit 130 may send and receive signals and transmit data with the mobile communication device 2 through the communication circuit 140. For example, the controller circuit 130 may transmit one (or a plurality of) audio signal generated by the audio-receiving circuit 120 to the mobile communication device 2 through the communication circuit 140. According to design requirements, a connection between the communication circuit 140 and the mobile communication device 2 may be completed through a wireless connection or a wired connection, wherein the wireless connection includes a Wi-Fi connection surface, a Bluetooth connection surface or other wireless connection surface, and the wired connection may be, for example, a USB connection surface or other wired connection surface.

The controller circuit 130 is coupled to the rotating module 110. The rotating module 110 may rotate the mobile communication device 2. The controller circuit 130 may confirm an audio direction of an audio source according to the plurality of audio signals of the audio-receiving circuit 120. According to the audio direction of the audio source, the controller circuit 130 may control the rotating module 110 to rotate (such as rotating the rotating module 110 on a level surface) to turn the mobile communication device 2 to face toward the audio source.

Figure 3:
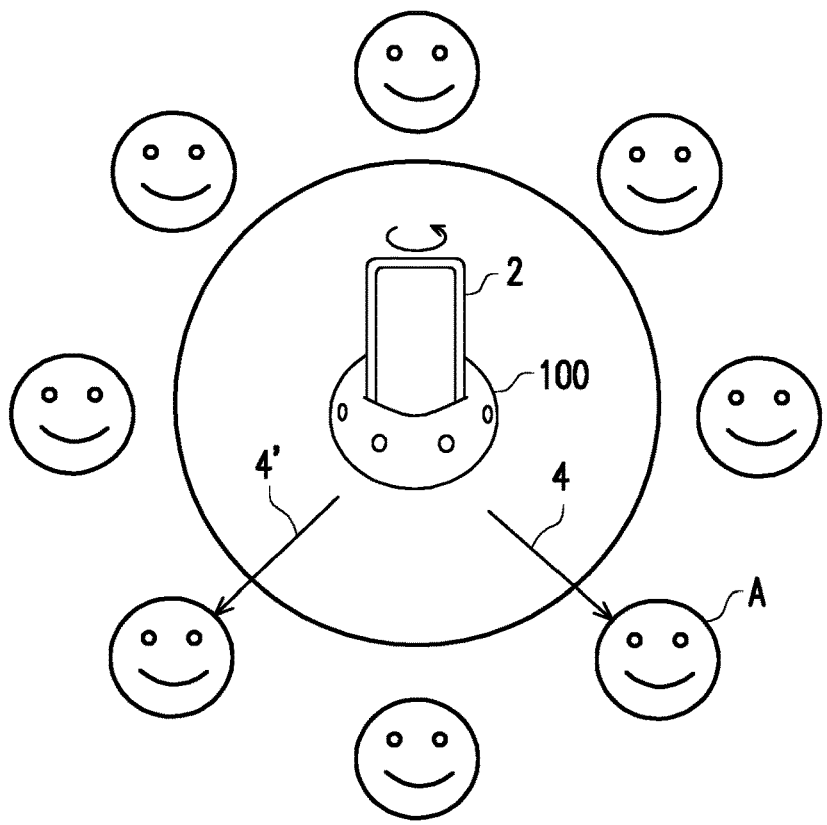
FIG. 3 is schematic view of a scenario of a process of a dock turning to an audio source according to an embodiment of the disclosure.

FIG. 3 is schematic view of a scenario of a process of a dock turning to an audio source according to an embodiment of the disclosure. Please refer to FIG. 2 and FIG. 3 simultaneously. It is assumed herein that an original direction of the dock 100 faces toward a direction 4'. When a speaker A emits a sound, the controller circuit 130 may confirm that an audio direction of an audio source is a direction 4 shown in FIG. 3 through an audio detecting of the audio-receiving circuit 120. When the controller circuit 130 of the dock 100 confirms that the audio-direction is the direction 4, the controller circuit 130 may control the rotating module 110 to rotate to turn the mobile communication device 2 from direction 4' to direction 4.

In addition, the dock 100 may further include a charging circuit (not shown in FIG. 2). When the mobile communication device 2 is inserted to the dock 100, the charging circuit of the dock 100 may charge the mobile communication device 2. According to application requirements, the dock 100 (applied with a usage of the mobile communication device 2) may be applied to a remote call of a plurality of people (or a remote meeting). Meeting participants may not have to change a position and/or a direction of the mobile communication device 2 by hand. The dock 100 may automatically bring (turn) the direction of the mobile communication device 2, making the mobile communication device 2 face toward a speaker A (tracking the speaker A). Therefore, the mobile communication device 2 may photograph a speaking situation of the speaker A. According to application requirements, the audio-receiving circuit 120 of the dock 100 may assist (or replace) a microphone of the mobile communication device 2 to receive audios.

Figure 4:
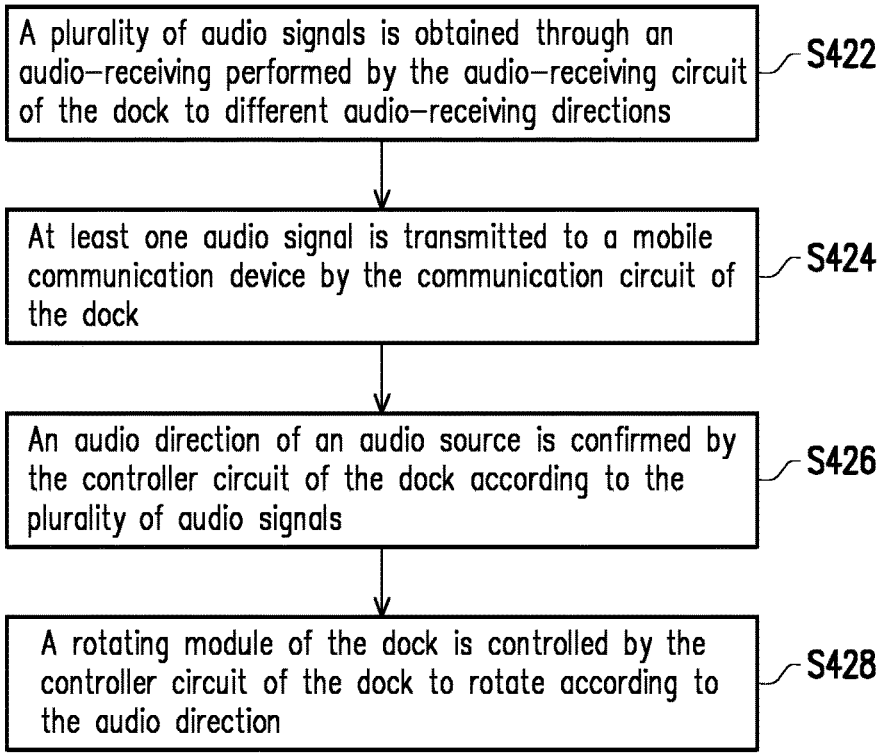
FIG. 4 is a schematic view of a procedure of an operation method of the dock according to the first embodiment of the disclosure.

FIG. 4 is a schematic view of a procedure of an operation method of the dock 100 according to the first embodiment of the disclosure. Please refer to FIG. 2 and FIG. 4. The audio-receiving circuit 120 of the dock 100 receives audios to different audio-receiving directions to obtain a plurality of audio signals in a step S422. The communication circuit 140 of the dock 100 transmits at least one of the plurality of audio signals of the audio-receiving circuit 120 to the mobile communication device 2 in a step S424. For example, the controller circuit 130 of the dock 100 may receive a plurality of audios from the audio-receiving circuit 120, and then the controller circuit 130 may integrate the plurality of audio signals of the audio-receiving circuit 120. The communication circuit 140 of the dock 100 may transmit an integrated audio signal to the mobile communication device 2. For example, assuming that the audio-receiving circuit 120 of the dock 100 is disposed to have audio-receiving components (such as the audio-receiving components 121-124) having four directions, but only three of which receive audio signals, then the controller circuit 130 may integrate the three audio signals and transmit an integrated audio signal to the mobile communication 2 through the communication circuit 140. The controller circuit 130 may use any audio processing algorithms to integrate the plurality of audio signals of the audio-receiving circuit 120. For example, the audio processing algorithms may be known audio processing algorithms or other algorithms.

The controller circuit 130 of the dock 100 in a step S426 may confirm an audio direction of an audio source according to the plurality of audio signals of the audio-receiving circuit 120. According to the audio direction of the audio source, the controller circuit 130 of the dock 100 in a step S428 may control the rotating module 110 to rotate the mobile communication device 2, so as to make the mobile communication device 2 face toward the audio source. Implementation details of a step S422 to a step S428 may be deduced by analogy through referring to related descriptions of FIG. 1 to FIG. 3, and would not be described again herein.

Figure 5:
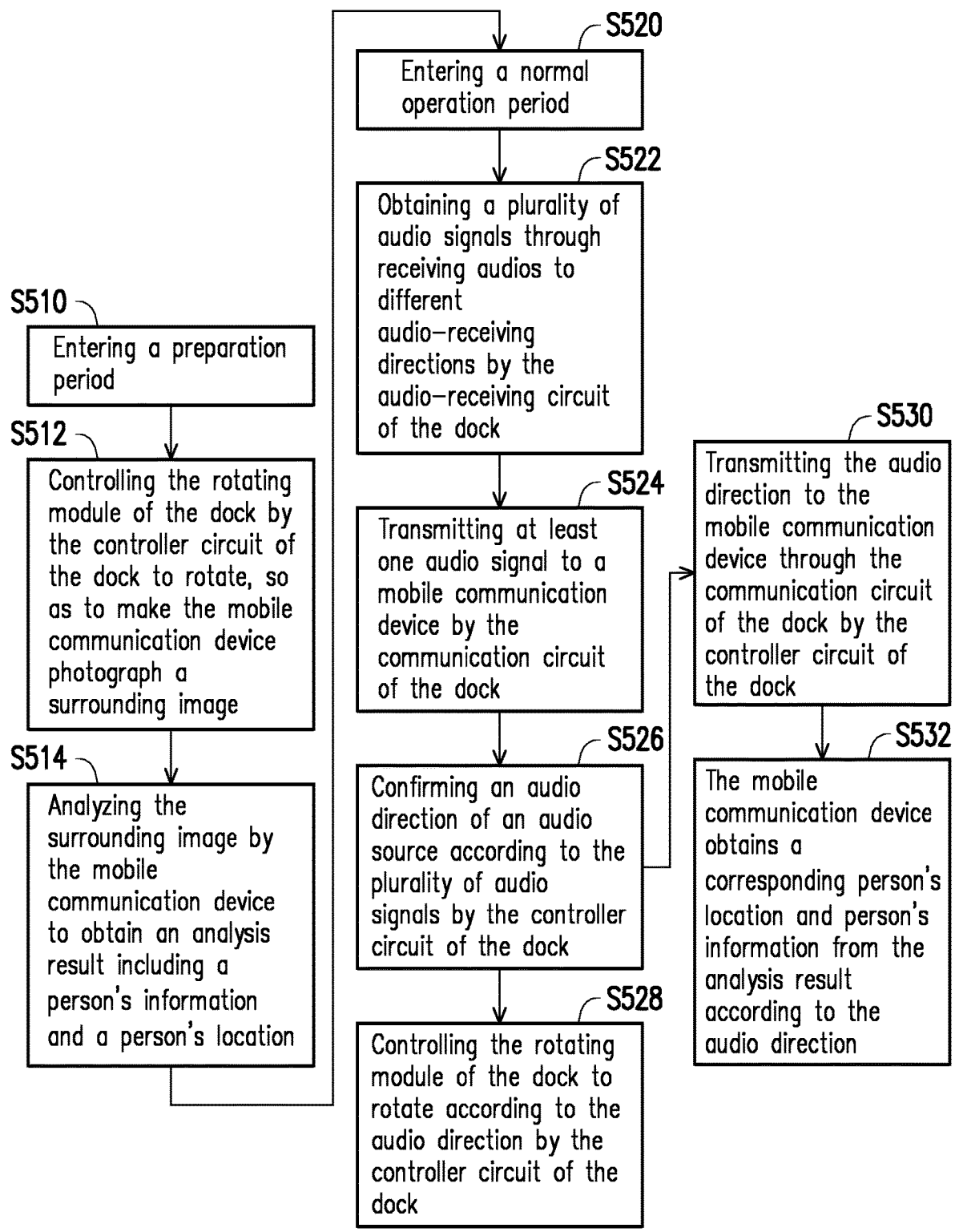
FIG. 5 is a schematic view of a procedure of an operation method of a dock according to the second embodiment of the disclosure.

FIG. 5 is a schematic view of a procedure of an operation method of a dock according to the second embodiment of the disclosure. Please refer to FIG. 2 and FIG. 5 simultaneously.

In the second embodiment, the controller circuit 130 of the dock 100 receives a plurality of audio signals generated by the audio-receiving circuit 120, and distinguishes whether a specific audio signal (titled as start instruction in the following content), such as "start the meeting", "please be in position", "please start photographing" or other similar terms, is included in the plurality of audio signals. The operation method of the dock shown in FIG. 5 includes following steps. Firstly, when the controller circuit 130 of the dock 100 confirms the plurality of audio signals generated by the audio-receiving circuit 120 includes the start instructions, the controller circuit 130 enters a preparation period (a step S510). Then, the controller circuit 130 may control the rotating module 110 to rotate (such as a 360 degrees rotation) in a step S512, and make the mobile communication device 2 photograph a surrounding image of the dock 100 simultaneously. Specifically, when the dock 100 enters the preparation period, the controller circuit 130 of the dock 100 transmits a photographing signal to the mobile communication device 2 through the communication circuit 140, making the mobile communication device 2 photograph continuously according to the photographing signal. In an embodiment, the controller circuit of the dock 100 may start rotating after sending out the photographing signal; in another embodiment, the controller circuit of the dock 100 may start rotating after confirming the mobile communication device 2 receives the photographing signal.

Further, the mobile communication device 2 analyzes the surrounding image in a step S514 and obtains an analysis result including a person's information and a person's location. Specifically, the mobile communication device 2 may execute a mobile application (abbreviated as APP) that analyzes a person's image. The APP includes a plurality of reference person's information for comparison, such as image information of an employee and a name, a title, and so on that correspond to each image information. In an embodiment, the APP uses, for example, a Video Image Detection (VID) technology to distinguish a surrounding image. Through the APP, the mobile communication device 2 may distinguish object feature information of a plurality of persons, and locations of each person (titled as a person's location in the following content) in the surrounding image, and compare the object feature information of the plurality of persons (such as facial features) with the image information of the plurality of reference person's information to find out a plurality of image information that matches the plurality object feature information and information such as names, titles and so on that correspond to each image information (titled as a person's information in the following content).

After the mobile communication device 2 generates an analysis result including a person's location and a corresponding a person's information, the mobile communication device 2 informs the dock 100, making the controller circuit 130 of the dock 100 enter a normal operation period (a step S520). In an embodiment, after the rotating module 110 rotate the mobile communication device 2 for 360 degrees, the controller circuit 130 of the dock 100 directly enters the normal operation period; in another embodiment, the controller circuit 130 of the dock 100 may enter the normal operation period through another start instruction. Following steps S522-S528 are the same as the steps S422-S428 of FIG. 4, and, therefore, would not be described again herein. After finishing the step S526, the controller circuit 130 may then execute the step S528 and a step S530.

In the step S530, the controller circuit 130 of the dock 100 may transmit an audio direction of an audio source to the mobile communication device 2 through the communication circuit 140 of the dock 100. The mobile communication device 2 may obtain a person's location and a person's information corresponding to the audio direction from the analysis result according to the audio direction of the audio source in a step S532. For example, the mobile communication device 2 may compare the person's location in the analysis result with the audio direction to obtain the person's information corresponding to the person's location, so as to know an identity of a speaker.

Figure 6:
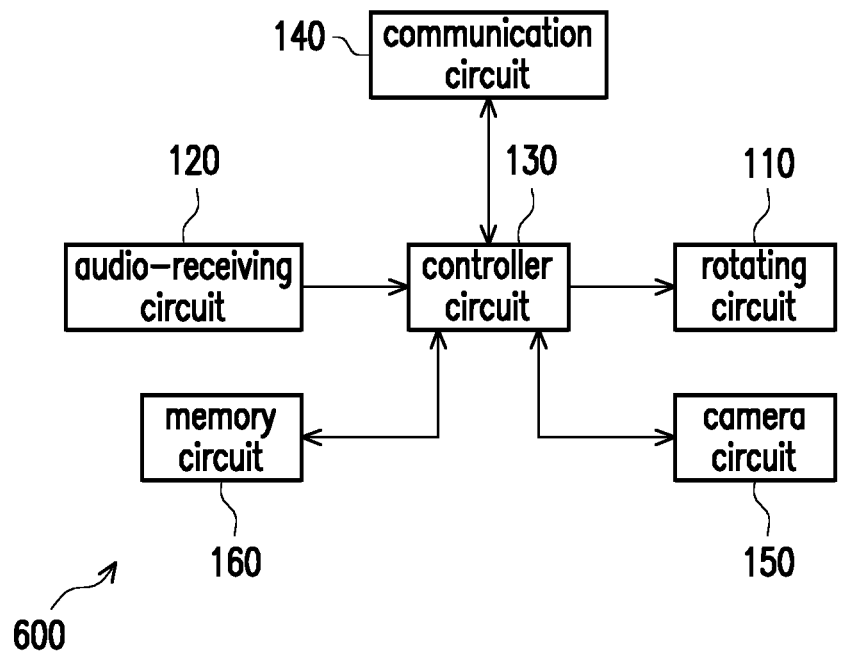
FIG. 6 is a schematic view of a circuit block of a dock according to a third and a fourth embodiments of the disclosure.

FIG. 6 is a schematic view of a circuit block of a dock 600 according to a third and a fourth embodiments of the disclosure. The dock 600 shown in FIG. 6 includes the rotating module 110, the audio-receiving circuit 120, the controller circuit 130, the communication circuit 140, a camera circuit 150, and a memory circuit 160. The rotating circuit 110, the audio-receiving circuit 120 and the communication circuit 140 shown in FIG. 6 may be deduced by analogy through referring related descriptions of the rotating module 110, the audio-receiving circuit 120 and the communication circuit 140 of FIG. 2, and therefore would not be described again herein. Compared to the embodiment of FIG. 2, the embodiment of FIG. 6 further includes the camera circuit 150 and the memory circuit 160 coupled to the controller circuit 130, wherein the camera circuit 150 is used to photograph a surrounding image of the dock 600, and the memory circuit 160 is used to store information.

Figure 7:
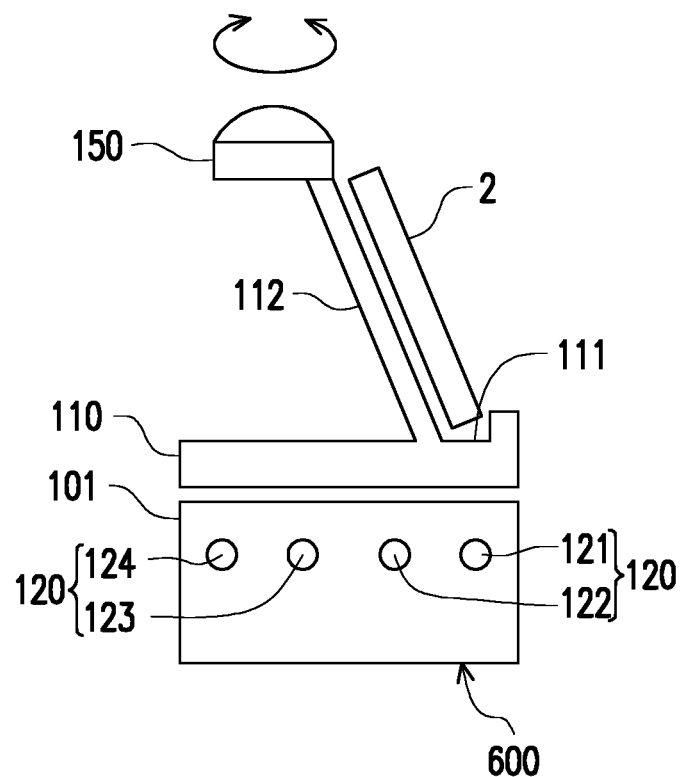
FIG. 7 is a schematic view of an exterior of the dock according to the third and the fourth embodiments of the disclosure.

FIG. 7 is a schematic view of an exterior of the dock 600 according to the third and the fourth embodiments of the disclosure. Please refer to FIG. 6 and FIG. 7 simultaneously. The rotating module 110 may support the mobile communication device 2. The rotating module 110 has a socket 111 and a backrest 112, and the mobile communication device 2 may lean on one side of the backrest 112. The mobile communication device 2 may be electrically connected to the communication circuit 140 through the socket 111. The camera circuit 150 is disposed on a top end of the backrest 112. According to design requirements, the camera circuit 150 may include a wide-angle lens photographing component, an ultra-wide-angle lens photographing component, a panoramic lens (also known as 360 degrees lens) photographing components or other photographing components, wherein the panoramic lens may be arranged by a symmetrical double lens, a dislocation double lens or a plurality of lens.

Figure 8:
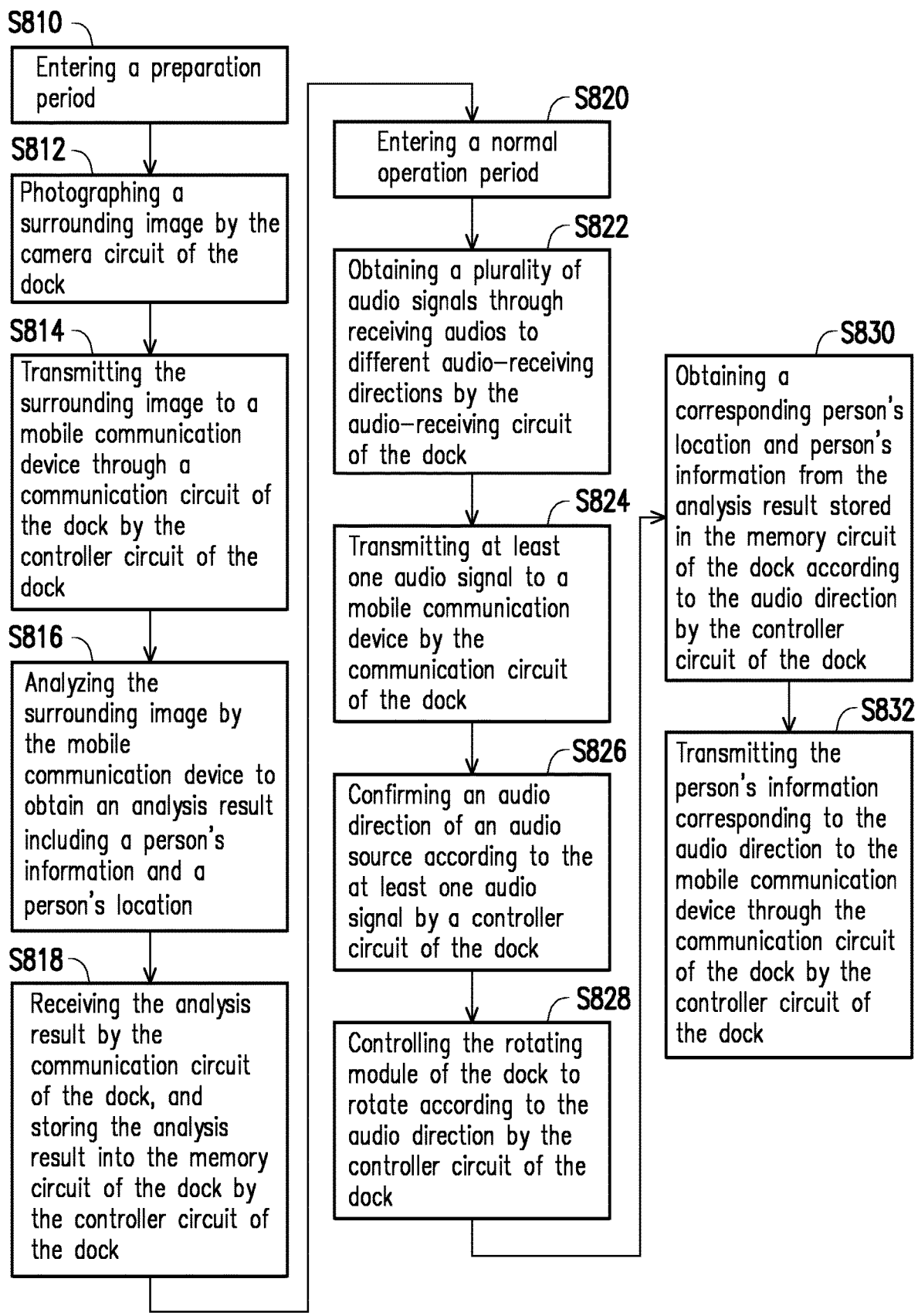
FIG. 8 is a schematic view of a procedure of an operation method of the dock according to the third embodiment of the disclosure.

FIG. 8 is a schematic view of a procedure of an operation method of the dock 600 according to the third embodiment of the disclosure. Please refer to FIG. 6 and FIG. 8 simultaneously, wherein the operation method of the dock of FIG. 8 includes following steps. Firstly, when the controller circuit 130 of the dock 600 confirms that a specific start instruction is included in the plurality of audio signals generated by the audio-receiving circuit 120, the controller circuit 130 enters a preparation period (a step S810) to control the camera circuit 150 to start detecting a surrounding image. The step S810 shown in FIG. 8 may be deduced by analogy through referring to related descriptions of the step S510 shown in FIG. 5. Further, the camera circuit 150 photographs the surrounding image in a step S812. Then, the controller circuit 130 transmits the surrounding image to the mobile communication device 2 through the communication circuit 140 in a step S814. The mobile communication device 2 analyzes the surrounding image in a step S816, and generates an analysis result including a person's information and a person's location.

Further, the controller circuit 130 receives the analysis result corresponding to the surrounding image transmitted by the mobile communication device 2 through the communication circuit 140 of the dock 600 in a step S818, and controls the controller circuit 130 to store the analysis result in the memory circuit 160. Then, the controller circuit 130 of the dock 600 enters a normal operation period (a step S820). In an embodiment, the controller circuit 130 may directly enter the normal operation period after completing a step 818. In another embodiment, the controller circuit 130 may be triggered by a start instruction to enter the normal operation period. Following steps S822-S828 is the same as the steps S422-S428, and therefore would not be described again herein. After finishing the step S828, the controller circuit 130 may further execute a step S830.

In the step S826, the controller circuit 130 of the dock 600 confirms an audio direction of an audio source according to an audio signal. In the step S830, the controller circuit 130 may obtain a person's location corresponding to the audio direction, and a person's information corresponding to the person's location from an analysis result stored in the memory circuit 160 according to the audio direction of the audio source. Further, in a step S832, the controller circuit 130 transmits the person's information corresponded by the audio direction of the audio source to the mobile communication device 2 through the communication circuit 140. Briefly, a difference between the third embodiment and the second embodiment is that a photographing action of the third embodiment is executed by the dock 600, and an analysis result of the mobile communication device 2 may be stored in the dock 600; when the dock 600 confirms an audio source, the dock 600 may compare an audio direction of the audio source with the analysis result to obtain a person's information of a speaker.

Figure 9:
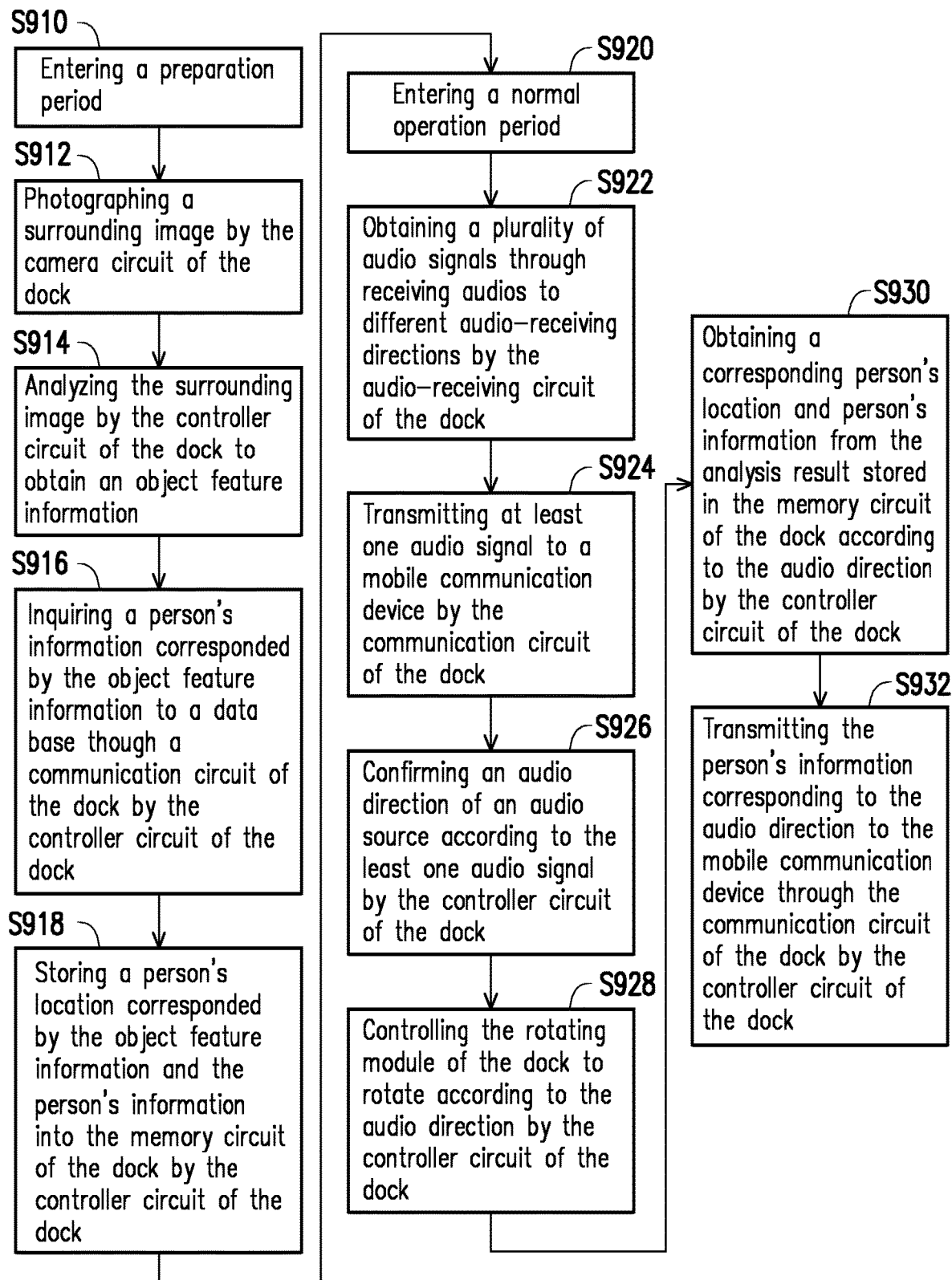
FIG. 9 is a schematic view of a procedure of an operation method of a dock according to the fourth embodiment of the disclosure.

FIG. 9 is a schematic view of a procedure of an operation method of the dock according to the fourth embodiment of the disclosure. Please refer to FIG. 6 and FIG. 9. The operation method of the dock of FIG. 9 includes following steps. When the controller circuit 130 of the dock 600 confirms that a specific start instruction is included in the plurality of audio signals generated by the audio-receiving circuit 120, the controller circuit 130 enters a preparation period (a step S910) to control the camera circuit 150 to start detecting a surrounding image. The step S910 shown by FIG. 9 may be deduced by analogy through referring to the step S510 shown in FIG. 5. The camera circuit 150 of the dock 600 photographs a surrounding image in a step S912. Further, the controller circuit 130 analyzes the surrounding image in a step S914 and obtains one or a plurality of object feature information. In the step S914, the controller circuit 130 may further analyze the surrounding image to obtain a location corresponding to the object feature information (which is a person's location).

The controller circuit 130 inquires a person's information corresponded by the object feature information to a remote data base (not shown, such as a cloud data base) through the communication circuit 140 of the dock 600 in a step S916. For example, the data base stores information such as images, names and titles of employees; the dock 600 may be connected with the cloud data base and transmits data through the communication circuit 140. In some other embodiments, the data base may be stored in the dock 600, such as being built in the memory circuit 160.

After completing the inquiry of the data base, the controller circuit 130 may store the person's information and the corresponding person's location in the memory circuit 160 (a step S918). Then, the controller circuit 130 enters a normal operation period (a step S920). In an embodiment, the controller circuit 130 may directly enters the normal operation period after completing the step S918. In another embodiment, the controller circuit 130 may be triggered by a start instruction to enter the normal operation period. Following steps S922-S928 is the same as the steps of S422-S428 of FIG. 4, and therefore would not be described again herein. After finishing the step S928, the controller circuit 130 may further execute a step S930.

In the step S926, the controller circuit 130 of the dock 600 confirms an audio direction of an audio source according to an audio signal. After confirming the audio direction of the audio signal, the controller circuit 130 obtains a person's information and a person's location corresponding to the audio direction from the memory circuit 160 according to the audio direction of the audio source (a step S930). For example, the controller circuit 130 compares the audio direction of the audio source with the analysis result stored in the memory circuit 160, so as to obtain the person's location that meets the audio direction, and the person's information corresponding to the person's location. Further, the controller circuit 130 transmits the person's information corresponding to the audio direction to the mobile communication device 2 through the communication circuit 140 of the dock 600 in a step S932. Briefly, the difference between the fourth embodiment and the second embodiment is that an action of photographing and an action of analyzing a surrounding image are all executed by the dock 600, and an analysis result may be stored in the memory circuit 160 of the dock 600. When the dock 600 further confirms an audio direction of an audio source, the audio direction of the audio source may be compared with the analysis result to obtain a person's information of a speaker.

Figure 10:
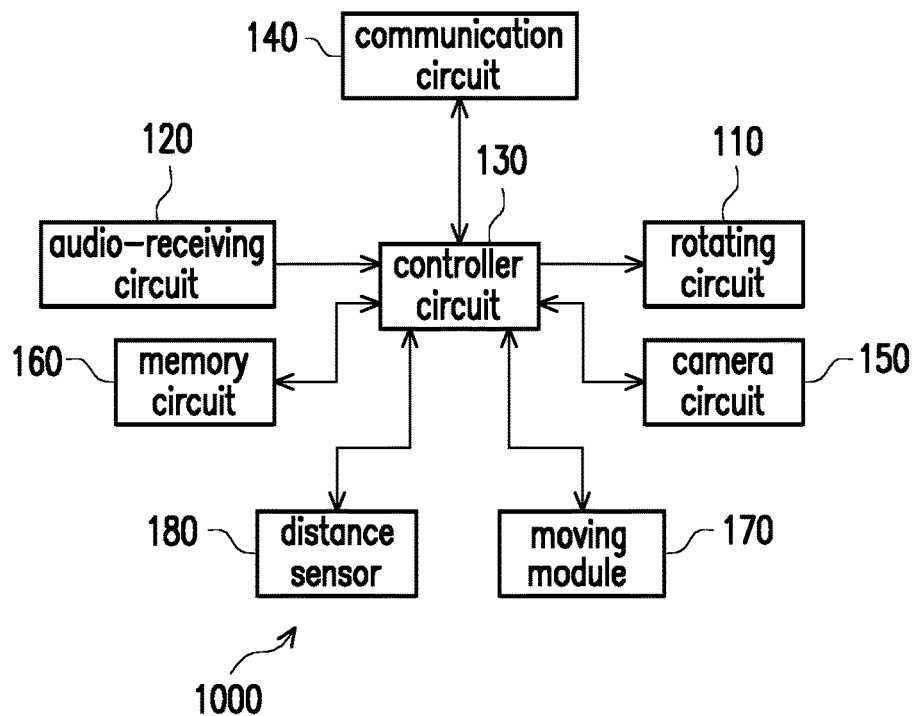
FIG. 10 is a schematic view of a circuit block of a dock of an embodiment of the disclosure according to a fifth embodiment of the disclosure.

Please refer to FIG. 10. FIG. 10 is a schematic view of a circuit block of the dock 1000 of an embodiment of the disclosure according to a fifth embodiment of the disclosure. The dock 1000 shown in FIG. 10 includes the rotating module 110, the audio-receiving circuit 120, the controller circuit 130, the communication circuit 140, the camera circuit 150, the memory circuit 160, a moving module 170, and a distance sensor 180. The rotating module 110, the audio-receiving circuit 120, the communication circuit 140, the camera circuit 150, and the memory circuit 160 shown in FIG. 6 may be deduced by analogy through referring to the rotating module 110, the audio-receiving circuit 120, the communication circuit 140, the camera circuit 150, and the memory circuit 160 shown in FIG. 6 and/or FIG. 7, and therefore would not be described again herein. Compared to the embodiment shown in FIG. 6, the embodiment shown in FIG. 10 further includes the moving module 170 and the distance sensor 180 coupled to the controller circuit 130, wherein the moving module 170 is used to change a position of the dock 1000, and the distance sensor 180 is used to sense a distance between the dock 1000 and an object in front of the dock 1000.

Figure 11:
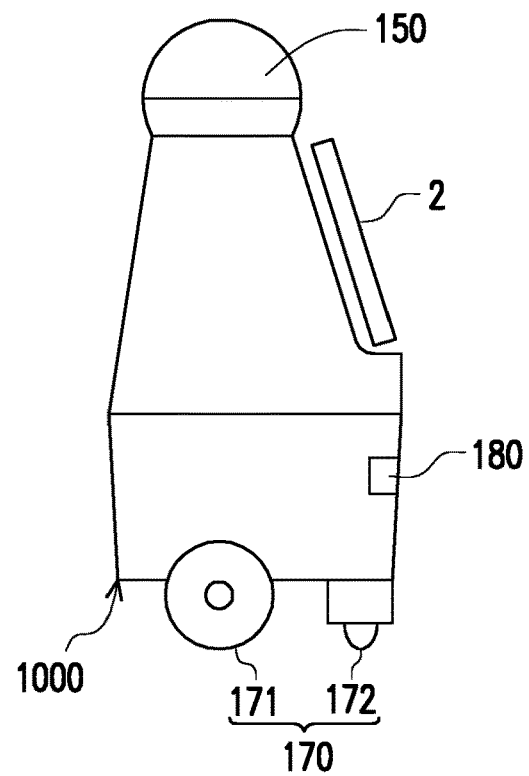
FIG. 11 is a schematic view of an exterior of the dock according to the fifth embodiment of the disclosure.

FIG. 11 is a schematic view of an exterior of the dock 1000 according to the fifth embodiment of the disclosure. Please refer to FIG. 10 and FIG. 11 simultaneously. The moving module 170 is disposed beneath the dock 1000. In an embodiment, the moving module 170 may include a driving motor (including a driving circuit) and a roller, wherein the roller may include two active rollers 171 and one auxiliary roller (slave roller) 172. The controller circuit 130 may control the moving module 170 to move the mobile communication device 2 and the dock 1000. For example, the controller circuit 130 of the dock 1000 may control the moving module 170 to make the driving motor rotate the active rollers 171 through a gear set. According to design requirements, the distance sensor 180 may be an infrared distance sensor device, an ultrasonic distance sensor or other distance sensor components/circuits. The abovementioned contents are only examples, and the present disclosure does not limit other possible implementation patterns of the moving module 170 and the distance sensor 180.

Compared to other embodiments, after the dock 1000 turns to an audio direction of an audio source, the distance sensor 180 of the dock 1000 of the fifth embodiment may detect an object distance. The object distance herein means a distance between the dock 1000 and an object on the audio direction (or a forward direction of the dock 1000). Briefly, the distance is a movable safety distance of the dock 1000 toward a direction of a speaker. Further, according to the object distance and the audio direction, the controller circuit 130 may control the moving module 170 to move the mobile communication device 2 and the dock 1000 to shorten a distance between the mobile communication device 2 and the audio source (speaker) to achieve a better audio-receiving effect and photographing clarity.

Summing up, the dock of the embodiments receives audio through the audio-receiving circuit of the dock. An audio signal detected by the dock may be transmitted to a mobile communication device to solve a problem of insufficient audio-receiving effect of the mobile communication device. The controller circuit of the dock may determine an audio direction of an audio source according to the audio signal of the audio-receiving circuit. According to the audio direction, the rotating module of the dock may automatically turn the mobile communication device to the audio direction, making the mobile communication device automatically face toward a speaker. In some applicable scenarios, the dock of the embodiments may be applied to a remote call (or a remote meet) with a mobile communication device. Therefore, meeting participants may not have to change a direction and/or a position of the mobile communication device by hand. The dock may automatically bring the mobile communication device to track a speaker.

Although the disclosure has been disclosed in the above embodiments, the embodiments are not intended to limit the disclosure, and those skilled in the art may make some modifications and refinements without departing from the spirit and scope of the disclosure. Therefore, the scope of the disclosure is defined by the claims attached below.

What is claimed is:

1. A dock, which is suitable for propping up a mobile communication device, including:
    an audio-receiving circuit receiving audios to different audio directions to obtain a plurality of audio signals;
    a rotating module rotating the mobile communication device;
    a communication circuit connected to the mobile communication device; and
    a controller circuit coupled to the audio-receiving circuit, the rotating module and the communication circuit, wherein the controller circuit transmits at least one of the plurality of audio signals to the mobile communication device through the communication circuit, confirms an audio direction of an audio source according to the plurality of audio signals, analyzes the plurality of audio signals to determine whether a specific term is included in one of the plurality of audio signals, and enters a preparation period in response to the specific term included in one of the plurality of audio signals,
    wherein in the preparation period, the controller circuit controls the rotating module to rotate, transmits a photographing signal to the mobile communication device through the communication circuit to make the mobile communication device photograph a surrounding image continuously according to the photographing signal, and the mobile communication device analyzes the surrounding image to obtain an analysis result including a person's information and a person's location, and
    in a normal operation period entered after obtaining the analysis result, the controller circuit transmits the audio direction of the audio source to the mobile communication device through the communication circuit, the mobile communication device obtains the person's location and the person's information corresponding to the audio direction from the analysis result according to the audio direction of the audio source, and the controller circuit controls the rotating module to rotate according to the audio direction to bring the mobile communication device to face toward the audio source.

2. The dock according to claim 1, wherein the audio-receiving circuit comprises a microphone array.

3. The dock according to claim 1, wherein the audio-receiving circuit comprises a plurality of audio-receiving components receiving audios to obtain the plurality of audio signals, wherein audio-receiving directions of the plurality of audio-receiving components are different from one another.

4. The dock according to claim 1, further comprising:
    a camera circuit, coupled to the controller circuit, used to photograph the surrounding image in the preparation period; and
    a memory circuit coupled to the controller circuit.

5. The dock according to claim 4, wherein when the controller circuit confirms that the plurality of audio signals comprises a start instruction, the controller circuit enters the preparation period to control the camera circuit to start detecting the surrounding image, wherein the start instruction includes the specific term.

6. The dock according to claim 4, wherein
in the preparation period, the controller circuit transmits the surrounding image detected by the camera circuit to the mobile communication device through the communication circuit, receives an analysis result corresponding to the surrounding image transmitted by the mobile communication device through the communication circuit, and stores the analysis result into the memory circuit, and the analysis result comprises a person's information and a person's location; and
in the normal operation period, the controller circuit confirms the audio direction of the audio source according to the plurality of the audio signals, obtains the person's location and the person's information corresponding to the audio direction from the analysis result stored in the memory circuit according to the audio direction of the audio source, and transmits the person's information corresponded by the audio direction of the audio source to the mobile communication device through the communication circuit.

7. The dock according to claim 4, wherein
in the preparation period, the controller circuit analyzes the surrounding image to obtain at least one object feature information, inquires a person's information corresponded by the object feature information to a data base through the communication circuit, and stores the person's information and a person's location corresponded by the object feature information into the memory circuit; and
in the normal operation period, the controller circuit confirms the audio direction of the audio source according to the plurality of audio signals, obtains the person's location and the person's information corresponding to the audio direction from the memory circuit according to the audio direction of the audio source, and transmits the person's information corresponded by the audio direction of the audio source to the mobile communication device through the communication circuit.

8. The dock according to claim 1, further comprising:
a moving module, coupled to the controller circuit, used to change a location of the dock; and
a distance sensor coupled to the controller circuit:
wherein according to the audio direction of the audio source and an object distance detected by the distance sensor, the controller circuit controls the moving module to move the mobile communication device to shorten a distance between the mobile communication device and the audio source.

9. An operation method of a dock, wherein the dock is suitable for propping up a mobile communication device, comprising:
obtaining a plurality of audio signals through receiving audios to different audio-receiving directions by an audio-receiving circuit of the dock;
transmitting at least one of the plurality of audio signals to the mobile communication device by a communication circuit of the dock;
confirming an audio direction of an audio source according to the plurality of audio signals by a controller circuit of the dock;
analyzing the plurality of audio signals to determine whether a specific term is included in one of the plurality of audio signals, and entering a preparation period response to the specific term included in one of the plurality of audio signals, wherein in the preparation period, controlling a rotating module of the dock to rotate by the controller circuit, and transmitting a photographing signal to the mobile communication device through the communication circuit by the controller circuit to make the mobile communication device photograph a surrounding image continuously according to the photographing signal, and analyzing the surrounding image by the mobile communication device to obtain an analysis result, wherein the analysis result comprises a person's information and a person's location; and
in a normal operation period entered after obtaining the analysis result, wherein in the normal operation period, transmitting the audio direction of the audio source to the mobile communication device through the communication circuit and controlling the rotating module to rotate according to the audio direction so as to make the mobile communication device face toward the audio source by the controller circuit, wherein the mobile communication device obtains the person's location and the person's information corresponding to the audio direction from the analysis result according to the audio direction of the audio source.

10. The operation method according to claim 9, wherein the audio-receiving circuit comprises a microphone array.

11. The operation method according to claim 9, wherein operation of receiving audios to different audio-receiving directions comprises:
obtaining the plurality of audio signals through receiving audios by a plurality of audio-receiving components of the audio-receiving circuit, wherein the audio-receiving directions of the plurality of audio-receiving components are different from one another.

12. The operation method according to claim 9, further comprising:
in the preparation period, photographing the surrounding image by a camera circuit of the dock.

13. The operation method according to claim 12, further comprising:
when the controller circuit of the dock confirms that the plurality of audio signals comprises a start instruction, the controller circuit of the dock enters the preparation period to control the camera circuit of the dock to start detecting the surrounding image, wherein the start instruction includes the specific term.

14. The operation method according to claim 12, further comprising:
in the preparation period, transmitting the surrounding image detected by the camera circuit of the dock to the mobile communication device through the communication circuit of the dock by the controller circuit of the dock;
in the preparation period, receiving an analysis result corresponding to the surrounding image transmitted by the mobile communication device through the communication circuit of the dock by the controller circuit of the dock, and storing the analysis result into a memory circuit of the dock by the controller circuit of the dock, wherein the analysis result comprises a person's information and a person's location; and
in the normal operation period, confirming the audio direction of the audio source according to the plurality of the audio signals by the controller circuit, obtaining the person's location and the person's information corresponding to the audio direction from the analysis result stored in the memory circuit according to the audio direction of the audio source by the controller circuit, and transmitting the person's information corresponded by the audio direction of the audio source to the mobile communication device through the communication circuit by the controller circuit.

15. The operation method according to claim 12, further comprising:

in the preparation period, analyzing the surrounding image by the controller circuit of the dock to obtain at least one object feature information;

in the preparation period, inquiring a person's information corresponded by the object feature information to a data base though the communication circuit of the dock by the controller circuit of the dock, and storing a person's location corresponded by the object feature information and the person's information into a memory circuit of the dock by the controller circuit of the dock; and in the normal operation period, confirming the audio direction of the audio source according to the plurality of audio signals by the controller circuit, obtaining the person's location and the person's information corresponding to the audio direction from the memory circuit according to the audio direction of the audio source by the controller circuit, and transmitting the person's information corresponded by the audio direction of the audio source to the mobile communication device through the communication circuit by the controller circuit.

16. The operation method according to claim 9, further comprising:

detecting an object distance by a distance sensor of the dock; and controlling a moving module of the dock by the controller circuit of the dock to change the position of the dock according to the audio direction of the audio source and the object distance, so as to move the mobile communication device to shorten a distance between the mobile communication device and the audio source.

* * * * *